United States Patent Office 3,717,051
Patented Feb. 20, 1973

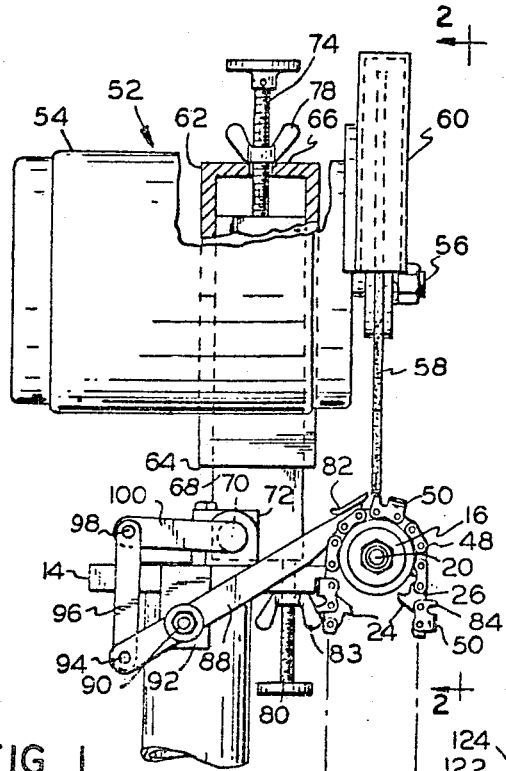
FIG. 1
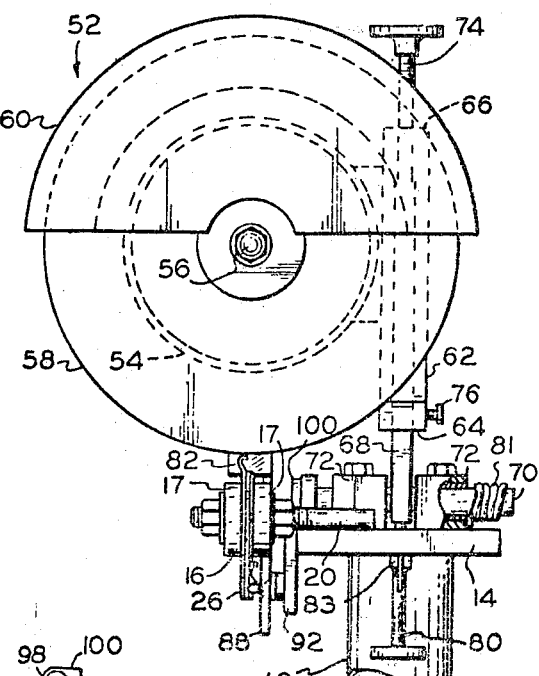
FIG. 2
FIG. 10
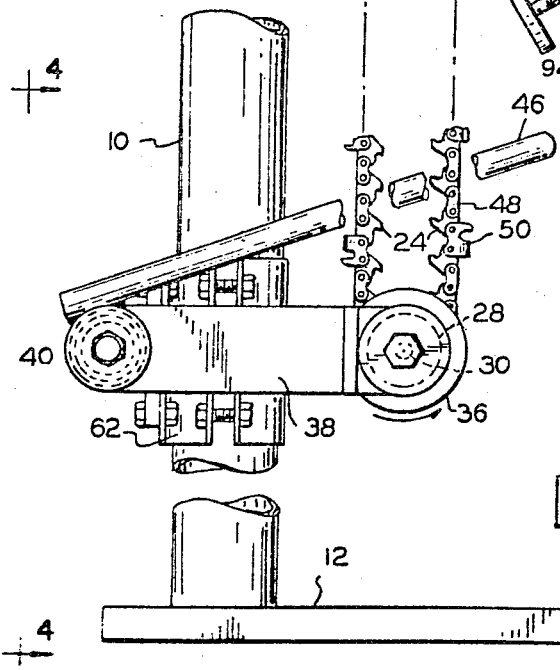
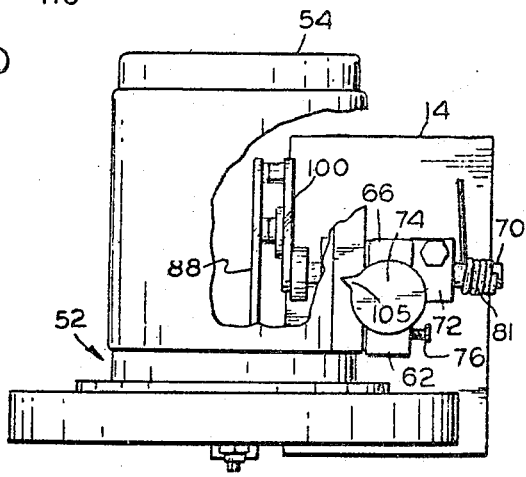
FIG. 3

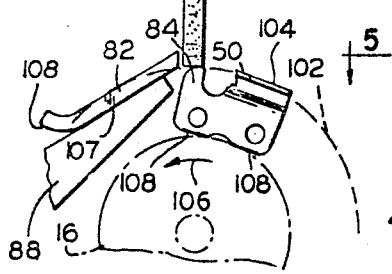
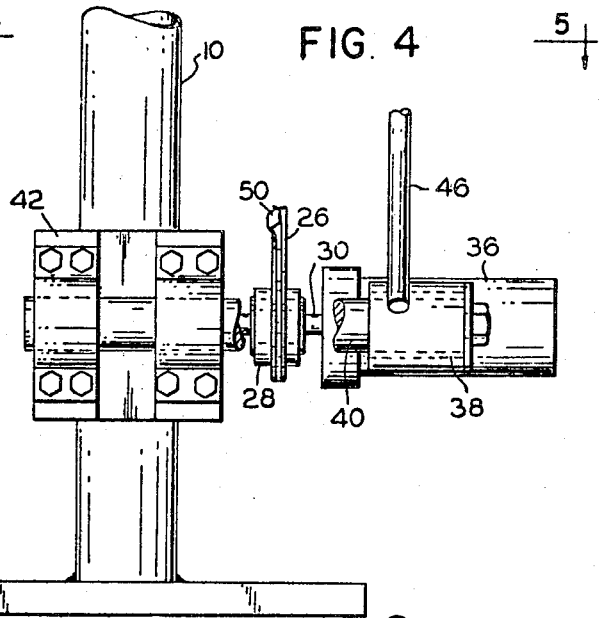
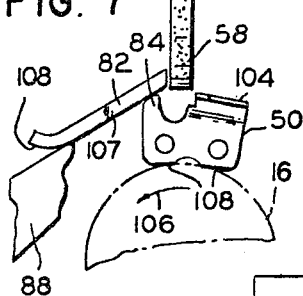
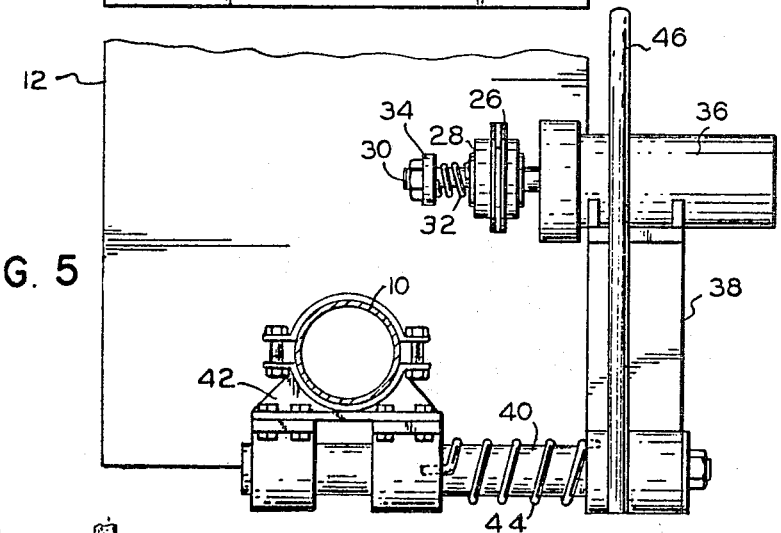
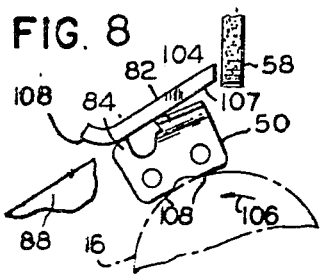
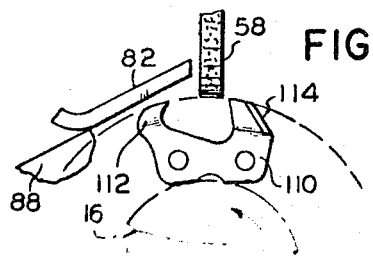

3,717,051
SAW CHAIN DEPTH GAUGE GRINDER
Elmer R. Silvey, Rte. 1, P.O. Box 138,
Eagle Point, Oreg. 97524
Continuation of abandoned application Ser. No. 39,731,
May 22, 1970. This application May 24, 1971, Ser.
No. 146,510
Int. Cl. B23d 63/16
U.S. Cl. 76—37                9 Claims

ABSTRACT OF THE DISCLOSURE

A machine primarily useful for accurately grinding the depth gauges of the cutter links of saw chains to a predetermined height is provided with a pair of spaced pulleys for supporting the saw chain under tension. One of the pulleys is power driven for continuously driving the chain in the forward direction. A grinding wheel is positioned to grind the depth gauges as the cutter links progress around one of the sprockets. A cam member engaged by a depth gauge which has just been ground causes the grinding wheel to be lifted over the cutter element following each depth gauge. The machine can also be employed for sharpening the cutter elements of top sharpening chain and for grinding the tops of the trailing portions of the cutter elements of chipper and chisel chain to improve the boring properties of such chains.

---

This application is a continuation of Ser. No. 39,731, filed May 22, 1970, now abandoned.

BACKGROUND OF THE INVENTION

The depth gauges positioned on the cutter links of chipper and chisel saw chains for regulating the depth of cutting by the following cutter elements on such cutter links, must be of the proper height, i.e. a height somewhat lower than that of the leading edges of the cutter elements, if efficient cutting by the saw chain is to be accomplished. Furthermore, it is important that the depth gauges all be of the same height.

The cutter elements of chipper or chisel saw chains are individually sharpened either by carefully filing these cutter elements or by employing chain saw sharpening machines having a grinding element shaped to fit the contours of the particular cutting element being sharpened. This is an intermittent operation in which each cutter link is held in a stationary position in a suitable vise or gripping mechanism while it is filed or while a rotating grinding wheel is moved into position to sharpen a cutter element. The depth gauges are then usually lowered to the correct height in a separate but similar intermittent operation, for example, by using a file and a depth gauge jointing guide for the file or by manually bringing a grinding wheel into contact with the outer end of each of the depth gauges. This is a time-consuming operation and in the case of the employment of a grinding wheel, the accuracy obtained in bringing the depth gauges to a proper height is usually quite poor. Thus the depth of grinding varies considerably due to uneven pressure exerted by the hand of the user of the grinding equipment even when a stop is employed to limit the advance of the grinding mechanism.

SUMMARY

In accordance with the present invention, the depth gauges of chipper and chisel saw chains are rapidly and accurately brought to uniform predetermined height in a grinding operation in which the saw chain is moved longitudinally of the chain to move the depth gauges through a grinding position. The saw chain is accurately supported at the grinding position and the depth gauges are ground by a grinding element resiliently urged toward the support and thus toward the top of the depth gauges, but held in the proper grinding position by an adjustable stop. This position of the grinding element will, however, also cause grinding of the cutter elements of the saw chain to destroy the utility of such elements unless the grinding element is moved away from the support and from the saw chain on the support during the time a cutter element is moved through the grinding position. Different saw chains have different spacings of the cutter links along the saw chain and in many cases, the spacing of the cutter links is not uniform along the chain particularly in the vicinity of the disconnect link found in most chains. This makes it extremely difficult to develop any sort of automatic mechanism for insuring that the grinding element is properly positioned to grind the depth gauges while at the same time preventing grinding of the cutting elements.

In the machine of the present invention, a rapidly rotating grinding wheel is normally positioned to grind the depth gauges to the correct height. Each depth gauge thus ground is immediately thereafter employed to cause the grinding wheel to be moved away from the saw chain support and the saw chain thereon to prevent injury to the following cutter element as it is moved into the grinding position. Irregular spaced cutter links do not in any way affect this operation.

In a specific embodiment of the invention, a cam member is positioned adjacent the grinding wheel so as to be engaged and moved by a depth gauge as such depth gauge is moved from the grinding position. Movement of the cam element is transmitted through a link and lever mechanism to lift the grinding wheel away from the support for the saw chain and thus allow the cutter element following the depth gauge to pass beneath the grinding wheel. The cutter element is moved through the grinding position without being ground and it in turn engages the cam member. The camming surface of this member is so shaped that the cutting edge on the leading portion of the cutting element is not damaged when the cutter element engages the cam member. As the cutter element moves out of engagement with the cam member, the grinding wheel is gradually lowered into position to grind the next depth gauge to the proper height and the operation just described is repeated.

The position of the grinding wheel during the grinding operation is accurately maintained by adjustable stops, one of which is employed to set the position of the cam member with respect to the saw chain, while the other adjustable stop is employed to set the position of the grinding wheel with respect to the top surfaces of the depth gauges of the saw chain. The first of these adjustments thus sets the distance the grinding wheel is moved away from the saw chain after a depth gauge has been ground in order to enable the following cutter element to pass beneath the grinding wheel while the second of such adjustments sets the height to which the depth gauge is ground.

The machine of the present application can also be efficiently employed to top sharpen top sharpening saw chains, or to grind the trailing portions of the top plates of chipper or chisel chain cutter elements to increase the efficiency of boring operations in which the cutting is done by the cutter elements on the cutter links passing around the nose portion of the saw bar. This can be accomplished by merely varying the two adjustments discussed above.

It is therefore an object of the invention to provide an improved apparatus for accurately and rapidly grinding the depth gauges of saw chains to a predetermined height and to provide a machine which can also be employed for sharpening top sharpening chain and grinding the trailing portions of the top plates of chisel and chipper chains to increase the boring efficiency of such chains.

BRIEF DESCRIPTION OF THE DRAWINGS

FIG. 1 is a side elevation of a preferred embodiment of the invention with parts broken away to show internal structure;

FIG. 2 is a partial front elevation of the upper portion of the machine of FIG. 1 viewed along the line 2—2 of FIG. 1;

FIG. 3 is a top view of the machine of FIGS. 1 and 2, with parts broken away to show structure which would otherwise be obscured;

FIG. 4 is a partial rear view of the lower portion of the machine of FIGS. 1 to 3 viewed along the line 4—4 of FIG. 1, also with parts broken away;

FIG. 5 is a horizontal section taken on the line 5—5 of FIG. 4;

FIG. 6 is a diagrammatic view showing a chisel saw chain cutter link supported in depth gauge grinding position;

FIG. 7 is a view similar to FIG. 6, showing a subsequent position of the cutter link of FIG. 6, in which the depth gauge has engaged the cam member;

FIG. 8 is a view similar to FIGS. 6 and 7 showing the cutter link in a position in which the cutter element has also engaged the cam member;

FIG. 9 is a diagrammatic view showing a top sharpening saw chain link being passed through the grinding position; and FIG. 10 is a fragmentary side elevation of a modification of the cam member adjusting mechanism.

DESCRIPTION OF PREFERRED EMBODIMENT

As shown most clearly in FIG. 1, the machine of the present invention includes an upstanding standard 10 mounted upon a base 12. A platform 14 is secured to the upper end of the standard 10 to provide a support for a grinding mechanism, more fully described below, and also to provide a support for a saw chain supporting pulley 16 including two separate pulley members 17 journaled upon a stub shaft 20 secured to and extending laterally and horizontally from the front portion of the platform 14 as shown in FIG. 2. The two pulley members 17 are spaced axially apart by a spacer member (not shown) to provide a slot for the reception of drive lugs 24 on the drive links of a saw chain 26 as shown in FIG. 1. The two pulley members of the pulley 16 are freely rotatable on the shaft 20 and may conveniently be ball bearings in which the outer race members of the bearings constitute the pulley elements. The saw chain 26 is trained around the pulley 16 and is also trained around a similar lower pulley 28. The two pulley members of the lower pulley 28, shown most clearly in FIG. 5, are mounted on a horizontally extending shaft 30 so as to rotate with such shaft and one of such pulley members is spring pressed toward the other by a coiled compression spring 32 between such pulley member and a collar 34 secured on the end of the shaft 30.

The shaft 30 is driven from a geared motor 36 mounted upon one end of a horizontally extending support arm 38 having its other end journaled on one end of a stub shaft 40 which extends parallel to the shaft 30 and has its other end secured to a bracket structure 42 clamped to the standard 10. A coil spring 44 surrounding the midportion of the stub shaft 40 extends between the bracket structure 42 and the support arm 38 for resiliently urging the support arm 38 in a clockwise direction in FIG. 1 to thus apply tension to the saw chain 26 on the two pulleys 16 and 28. A lever 46 has one end welded to the support arm 38 and its other end extending forwardly of the machine to enable the support arm and motor 36 carried thereby to be manually rotated in a counterclockwise direction in FIG. 1 to release the tension on the saw chain 26, and enable the saw chain to be installed upon or removed from the pulleys 16 and 28.

A substantial force is exerted on the support arm 38 by the spring 44 to hold the chain 26 in tension and thus hold the lower edges of the side links or tie straps 48 of the saw chain and also the lower surfaces of cutter links 50 in firm contact with the upper surfaces of the pulley members 17 of the pulley 16. This tension also holds the drive lugs 24 of the drive links of the saw chain in the slot between the pulley members 17 of the pulley 16 and in the similar slot between the pulley members of the pulley 28. The pulley 28 is driven by geared motor 36 in a counterclockwise direction of FIG. 1. The pulley members of the lower pulley 28 grip the drive lugs 24 of the saw chain 26 with the result that the saw chain 26 is driven around the lower pulley and around the upper periphery of the pulley 16 while the cutter links 50 are held firmly down against the upper surfaces of the pulley members of the pulley 16.

A grinding mechanism indicated generally at 52 is shown in FIGS. 1, 2 and 3. This grinding mechanism includes a high speed motor 54 positioned to have its shaft 56 extend substantially horizontally and at right angles to the axis of rotation of the pulley 16. A grinding wheel 58 is secured on the end of the shaft 56 so as to be rotated by the motor 54. The wheel 58 is quite narrow in axial thickness, this wheel usually being of the order of $\frac{3}{16}$" or less. This wheel is substantially greater in diameter than the arcuate path of the saw chain 16 about the pulley 16 and, for example, may have a diameter of 8 inches. The upper portion of the wheel 58 is preferably covered by a wheel guard 60 and has its lower peripheral edge positioned directly above the pulley 16, so that the median plane of the grinding wheel 58 passes through or substantially through the axis of rotation of the pulley 16 and similarly the median plane of the slot in the pulley 16 and of the saw chain supported by this pulley passes through the axis of rotation of the grinding wheel.

One side of the motor 54 is secured to a slide member 62 in the form of a vertically extending elongated rectangular casing having a lower open end 64 and a closed upper end 66, as shown most clearly in FIG. 1. A rectangular internal support member is received in and fits the interior of the slide member 62, in sliding engagement therewith and has its lower end secured to a horizontally extending shaft 70 journaled in bearing blocks 72 secured to the upper surface of the platform 14. An adjusting screw 74 extends through a screw-threaded aperture in the upper end 66 of the slide member 62 and has its lower end in engagement with the upper end of the support member 68 to hold the motor 54 in an elevated adjusted position on the support member 68. The motor and grinding wheel are urged downwardly by gravity and also a set screw 76 extending through the side of the slide member 62 into contact with the side of the support member 68 can be tightened to hold the slide member in adjusted position on the support member. A wing nut 78 is employed as a lock nut to maintain the adjusting screw 74 in adjusted position.

The shaft 70 to which the lower end of the support member 68 is secured is offset rearwardly of the center line of the support member 68 and the forward portion of the lower end of the support member 68 is positioned directly above and in contact with a second adjusting screw 80 extending upwardly through a threaded aperture in the platform 14. A coil spring 81 is positioned upon the shaft 70 and has one end engaging this shaft and its other end engaging the platform 14 to resiliently urge the shaft 70 and support member 68 in a clockwise direction in FIG. 1 about the axis of the shaft. It will be apparent that rotation of the adjusting screw 80 will tip the support member 68 for the slide member 62 about the axis of the shaft 70 to raise and lower the grinding wheel 58 of the grinding mechanism 52.

Adjusting screw 80 is however employed to set the position of a cam member 82 which is located adjacent the lower periphery of the grinding wheel 58 so as to be engaged by the depth gauge 84 of the saw chain cutter link 50 of the saw chain 26, and a locking wing nut 83 is provided on the screw 80 to hold it in adjusted position. As shown in FIG. 1, the cam member 82 is secured to one end of a cam lever 88 pivoted intermediate its ends at 90 to a bracket 92 extending downwardly from and secured to a side edge of the platform 14. The other end of the cam lever 88 is pivotally connected at 94 to the lower end of the link 96 which extends upwardly and has its upper end pivotally connected at 98 to the end of a lever 100 having its other end secured to an end of the shaft 70. It will be apparent that pivoting of the grinding mechanism 52 by the adjusting screw in a counterclockwise direction in FIG. 1 about the shaft 70 by the adjusting screw 80 will cause a similar pivotal movement of the lever 100 about the shaft 70. This motion will be transmitted to the cam lever 88 through the link 96 to cause counterclockwise pivotal movement of the lever 88 to move the cam member 82 away from the saw chain 26 on the pulley 16.

A suitable cam member 82 is provided with a planar camming surface directed toward and parallel to the axis of the pulley 16. When the cam member is in position to be engaged by the depth gauge, this camming surface is also generally tangent to the arcuate path of the saw chain around the pulley 16 at a position which is about 30° along such arc from the grinding position. In this specific embodiment shown in the drawings the camming surface extends generally parallel to the cam lever 88 and the axis of the pivot 90 for this lever is parallel to and spaced from the axis of the pulley 16 about four times the radial distance from the axis of the pulley to the camming surface.

For grinding depth gauges of saw chain cutter links, the position of the cam member 82 is adjusted by the screw 80 until the upper end of a depth gauge 84 of the cutter link 50, traveling along a path indicated by the dotted line 102 in FIG. 6, will engage the cam member 82 as it leaves the grinding position to raise the grinding wheel sufficient to clear the cutter element 104 as such cutter element is moved through the grinding position. The adjustment also changes the vertical position of the grinding wheel and, for example, an initial adjustment may be made by the screw 80 while the grinding wheel 58 is elevated from the position shown in FIG. 6. The grinding wheel 58 may thereafter be lowered to the position shown in FIG. 6 by turning the adjusting screw 74. This screw then further turned to provide the desired depth of grinding of the depth gauges. This depth will ordinarily be a few thousandths of an inch and the adjusting screw 74 may be provided with a pointer 105 to enable the operator to turn this screw the required angle of rotation. While the grinding wheel 58 is not rotating, the saw chain may be manipulated by hand to move a cutter link through the grinding position to be sure that the depth gauge 84 will move the cam member 82 a sufficient distance to cause the grinding wheel to clear the cutter element 104 and any necessary correcting adjustments made. An intermediate position of the cutter link showing the grinding wheel 58 raised to clear the cutter link 104 is illustrated in FIG. 7.

After the adjustments discussed above have been made, the grinding wheel motor 54 as well as the saw chain drive motor 36 can both be started at a time when the grinding wheel is between successive cutter links of the saw chain. The resulting movement of a cutter link 50 in the direction of the arrow 106 first causes engagement of the depth gauge 84 with the grinding wheel 58 to grind the upper surface of the depth gauge 84 to a predetermined height above the saw bar engaging surfaces 108 of the cutter link. The depth gauge thus ground will then engage the cam member 82 to raise the grinding wheel 58 through the lever and link mechanism previously described to cause the grinding wheel 58 to clear the cutter element 104 of the cutter link.

Continued movement of the cutter link in the direction 106 will cause the leading edge of the cutter element to engage the cam member 82 as indicated in FIG. 8. With the structure of the cam member above described, the angle at which the cutting edge on the leading portion of the cutter link 104 approaches the camming surface of the cam member 82 is sufficiently small that such cutting edge is not damaged. Further movement of the cutter link 50 from the position shown in FIG. 8 will cause the cutter link to move out of contact with the cam member 82. This cam member is provided with an upturned portion 108 at its end remote from the grinding wheel 58 providing an upwardly inclined lower surface so that the cam member 82 is gradually lowered back to its original position to gradually lower the grinding wheel 58 into its originally adjusted position for grinding the next depth gauge.

The modification shown in FIG. 10 makes the adjustment of the position of the grinding wheel 58 with respect to the saw chain by the adjusting screw 74 entirely independent of the adjustment of the position of the cam member 82 to cause the required lifting of the grinding wheel. In FIG. 10 a cam lever 88' is substituted for the cam lever 88 of FIG. 1. The cam lever 88' of FIG. 10 does not have a lever arm extending to the left in FIG. 10 beyond the pivot 90, but is otherwise the same as the lever cam 88 of FIG. 1. A separate lever element 116 has one end also pivotally mounted on the pivot 90 and its other end pivotally connected at 94 to the vertically extending link 96 also shown in FIG. 1.

A plate element 118 extending at right angles to and across the cam lever 88' has its edge welded to the cam lever adjacent the pivot 90 and a similar plate element 120 has its edge welded to the lever element 116 adjacent the pivot 90 so as to extend across the lever element 116 parallel to the plate element 118. An adjusting screw 122 has its threaded end extending through a screw-threaded aperture in the plate element 120 into contact with the plate element 118 and is provided with a locking wing nut 124. A tension coil spring 126 holds the plate 118 in contact with the end of the adjusting screw 122.

The adjusting screw 122 of FIG. 10 takes the place of the adjusting screw 80 of FIG. 1 and when the structure of FIG. 10 is employed, the adjusting screw 80 of FIGS. 1, 2 and 3 can be omitted and a suitable abutment (not shown) employed to normally hold the support member 68 in the position shown in FIG. 1 against the action of the spring 81 shown in FIGS. 2 and 3. It will be apparent that the adjusting screw 122 of FIG. 10 can be employed to set the position of the cam member 82 relative to the saw chain 26 when this cam member is not engaged by the saw chain without disturbing the adjustment of the grinding wheel 58 relative to the saw chain and, conversely, the position of the grinding wheel relative to the saw chain can be set by the adjusting screw 74 without changing the position of the cam member 82.

It is desirable to move the grinding wheel 58 away from the saw chain 26 the distance required to clear the cutter element 104 with the greatest practical leverage ratio between the cam member 82 and grinding mechanism 52. In a specific embodiment of the invention, it was found that a suitable movement of the grinding wheel through the lever and linkage arrangements shown in FIGS. 1, 2 and 3, and also FIG. 10, was approximately one-half that of the movement of the cam member.

While the description of the operation of the machine illustrated in FIGS. 6, 7 and 8 has been given with reference to chisel cutter links, the depth gauges of chipper cutter links can be ground to a predetermined height in exactly the same manner as that described with reference to these figures.

The machine of the present invention can also be employed to top sharpen cutter links 110 of top sharpening saw chain as illustrated in FIG. 9. This is done by employing the adjusting screw 80 of FIGS. 1 and 2 to raise the cam member 82 to a position so that no portion of the saw chain contacts the cam member. The grinding wheel 58 is then lowered by turning the adjusting screw 74 so that the grinding wheel contacts and grinds a small amount of metal from the top surfaces of the depth gauge 112 and cutter element 114 of the cutter link 110 as the saw chain is driven around the pulley 16. Even though the grinding wheel grinds the top of the cutter elements 114 slightly cylindrically concave along an axis extending longitudinally of the saw chain, it has been found that a top sharpening chain thus sharpened on a machine of the present invention has excellent cutting properties.

It is possible to grind the upper surface of the depth gauge 112 of the top sharpening cutter link 110 of FIG. 9 to a lower height than that provided by the top sharpening operation on such cutter link discussed above. This is done by adjusting the machine in exactly the same manner as described with respect to grinding the upper surfaces of the depth gauges of chisel and chipper saw chain. Thus the height of the depth gauges 112 of the top sharpening saw chain can be lowered from the height set by the diameter of the pulley 16, if desired. This is useful in sawing certain type of wood or in cases where the saw chain is used extensively for boring operations, in which the cutting is done by the cutter elements on the portion of the saw chain traveling around the nose end of a saw bar.

It is sometimes desirable to grind away a portion of the trailing edge of the cutter elements of chisel cutter links or of chipper cutter links, if the saw chain containing such cutter links is to be employed extensively for boring operations. This can be accomplished in the present machine in an operation very similar to that described with respect to sharpening top sharpening saw chain. Thus the cam member 82 can be adjusted upwardly out of possible contact with the saw chain and then the position of the grinding wheel 58 adjusted until the grinding wheel contacts only the trailing portion of the cutter element of the cutter links. The feasibility of this operation is apparent from the arcuate dotted line 102 of FIG. 6.

The machine of the present invention thus has particular utility for grinding the depth gauges of saw chain cutter links of the chisel or chipper type, and also has utility for sharpening top sharpening chain as well as lowering the height of the depth gauges of the cutter links of such chain below that obtained in a top sharpening operation. The machine also has utility for partially grinding away the trailing portions of the top plates of cutter elements of chisel and chipper saw chain.

I claim:
1. Apparatus for performing grinding operations on saw chain having cutter elements and depth gauges on links of said saw chain, said apparatus comprising:
   support means for said saw chain;
   saw chain moving means for moving said saw chain while supported on said support means in a direction longitudinally of said saw chain to thereby move said depth gauges and said cutter elements through a grinding position;
   grinding means for engaging the outer ends of said depth gauges while said depth gauges are in said grinding position and said links of said chain are supported on said support means;
   means to set said grinding means an adjustable distance from said support means to sucessively grind the top of each of said depth gauges to a uniform preset height;
   and means actuated by said depth gauges as each of said depth gauges is moved adjacent said grinding position by said saw chain moving means for moving said grinding means to a distance from said support means which is greater than said adjustable distance when said cutter elements are in said grinding position.

2. Apparatus in accordance with claim 1;
   in which said saw chain is supported at said grinding station for movement in an arc of a circle;
   and said means actuated by said depth gauges is a cam means successively engaged by the previously ground top portion of each of said depth gauges.

3. Apparatus in accordance with claim 2;
   in which said means to set said grinding means an adjustable distance from said support includes means urging said grinding means toward said chain and adjustable stop means limiting movement of said grinding means toward said chain;
   and said means actuated by said depth gauges includes means operated by said cam means for moving said grinding means away from said stop means when said cutter elements are in said grinding position.

4. Apparatus in accordance with claim 2 in which said cam means is a plate element having a depth gauge engaging surface extending generally tangent to said arc so as to be engaged by cutter elements following said depth gauges at an angle which does not damage the cutting edges of said cutter elements.

5. Apparatus in accordance with claim 3;
   in which said cam element is attached to said means actuated by said depth gauges so that said adjustable stop means sets the position of said cam means relative to said depth gauges;
   and said grinding means includes a rotary grinding element and additional adjustable means for adjustably setting the position of said grinding element relative to said saw chain when said grinding means is against said stop means.

6. Apparatus in accordance with claim 5;
   in which said adjustable stop means has a range of adjustment providing for moving said cam element out of the path of said depth gauges and cutter elements;
   and said additional adjustable means has a range of adjustment providing for bringing said grinding element into position for top sharpening top sharpenable saw chain or grinding the trailing top portions of the cutter elements of chipper or chisel saw chain to enhance the boring properties of chipper or chisel saw chain.

7. Apparatus in accordance with claim 5;
   in which said rotary grinding element is a thin disc substantially larger in diameter than said circle and mounted for rotation about an axis perpendicular to the axis of said circle and having its median plane passing substantially through said axis of said circle;
   said grinding element being positioned with its axis in the median plane of said saw chain.

8. Apparatus for performing grinding operations on saw chain having cutter elements and depth gauges on cutter links of said saw chain, said apparatus comprising:
   support means for said saw chain;
   saw chain moving means for moving said saw chain while supported on said support means in a direction longitudinally of said saw chain to thereby move said depth gauges and said cutter elements through a grinding position;
   grinding means for engaging the outer ends of said depth gauges while said depth gauges are in said grinding position and said links of said chain are supported on said support means;
   means to set grinding means a predetermined distance from said support means to successively grind the top of each of said depth gauges to a uniform preset height;

and means including an element engaged by said cutter links for increasing said distance of said grinding means from said support means when said cutter elements are in said grinding position.

9. Apparatus in accordance with claim 8 in which said element engaged by said cutter links include cam means actuated when said cutter elements are in said grinding position.

References Cited

UNITED STATES PATENTS 2,811,874   11/1957   Rethoret _____ 76—40
3,427,903   2/1969   Bodington _____ 76—41

DONALD R. SCHRAN, Primary Examiner

U.S. Cl. X.R.

76—25 A